Aug. 10, 1948.
L. F. THIRY
2,446,621
METHOD OF MAKING PRECISION ANTIVIBRATION MOUNTINGS
Filed Dec. 3, 1943
6 Sheets-Sheet 1
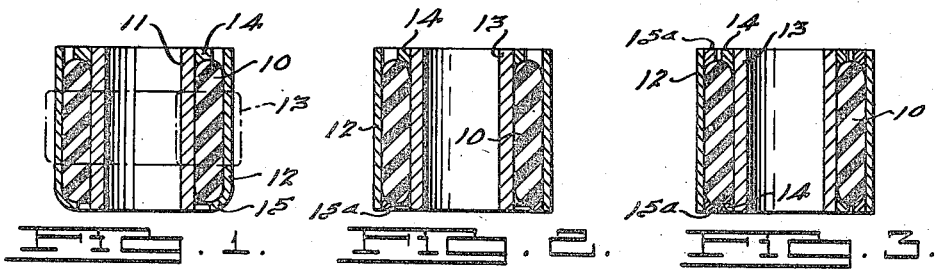
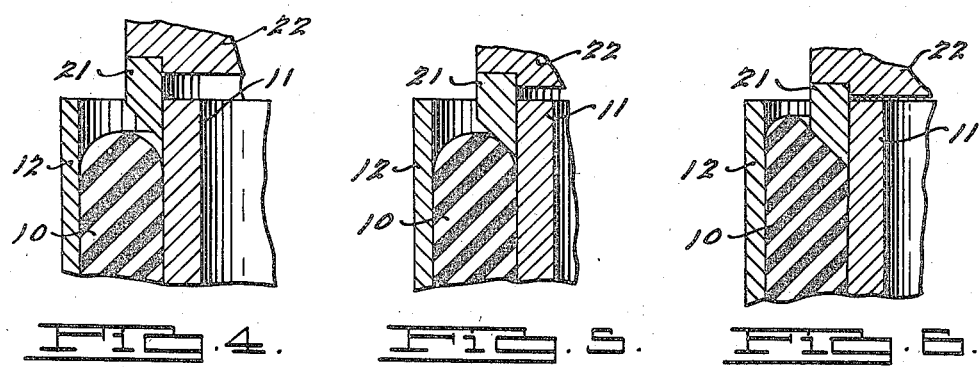
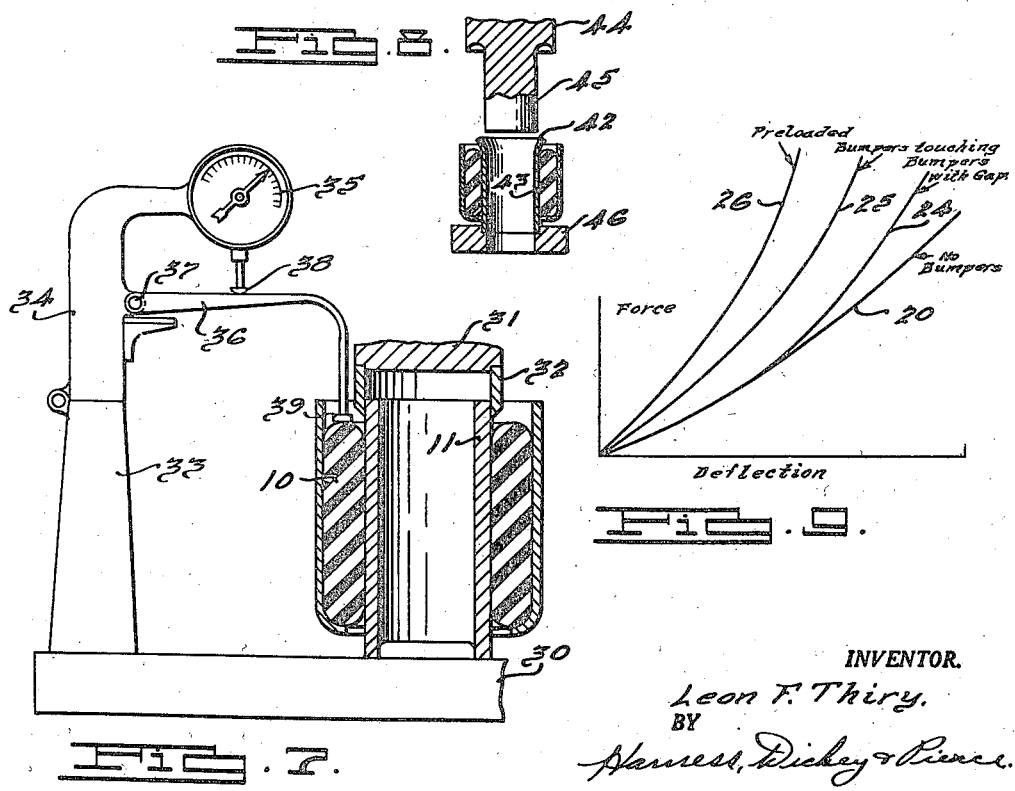
INVENTOR.
Leon F. Thiry.
BY
Harness, Dickey & Pierce.
ATTORNEYS.

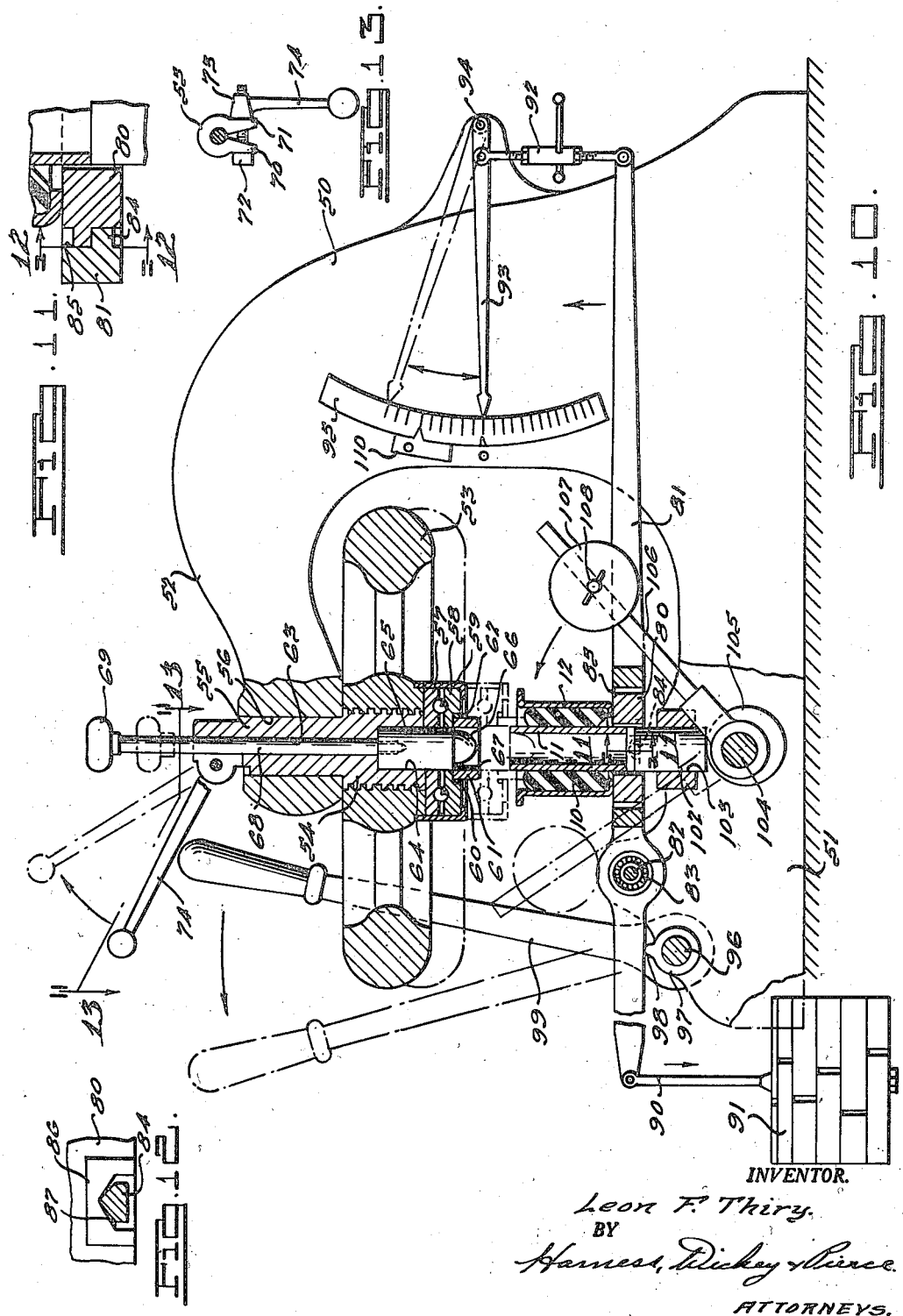

Aug. 10, 1948.                L. F. THIRY                    2,446,621
                      METHOD OF MAKING PRECISION
                         ANTIVIBRATION MOUNTINGS
Filed Dec. 3, 1943                                        6 Sheets-Sheet 3
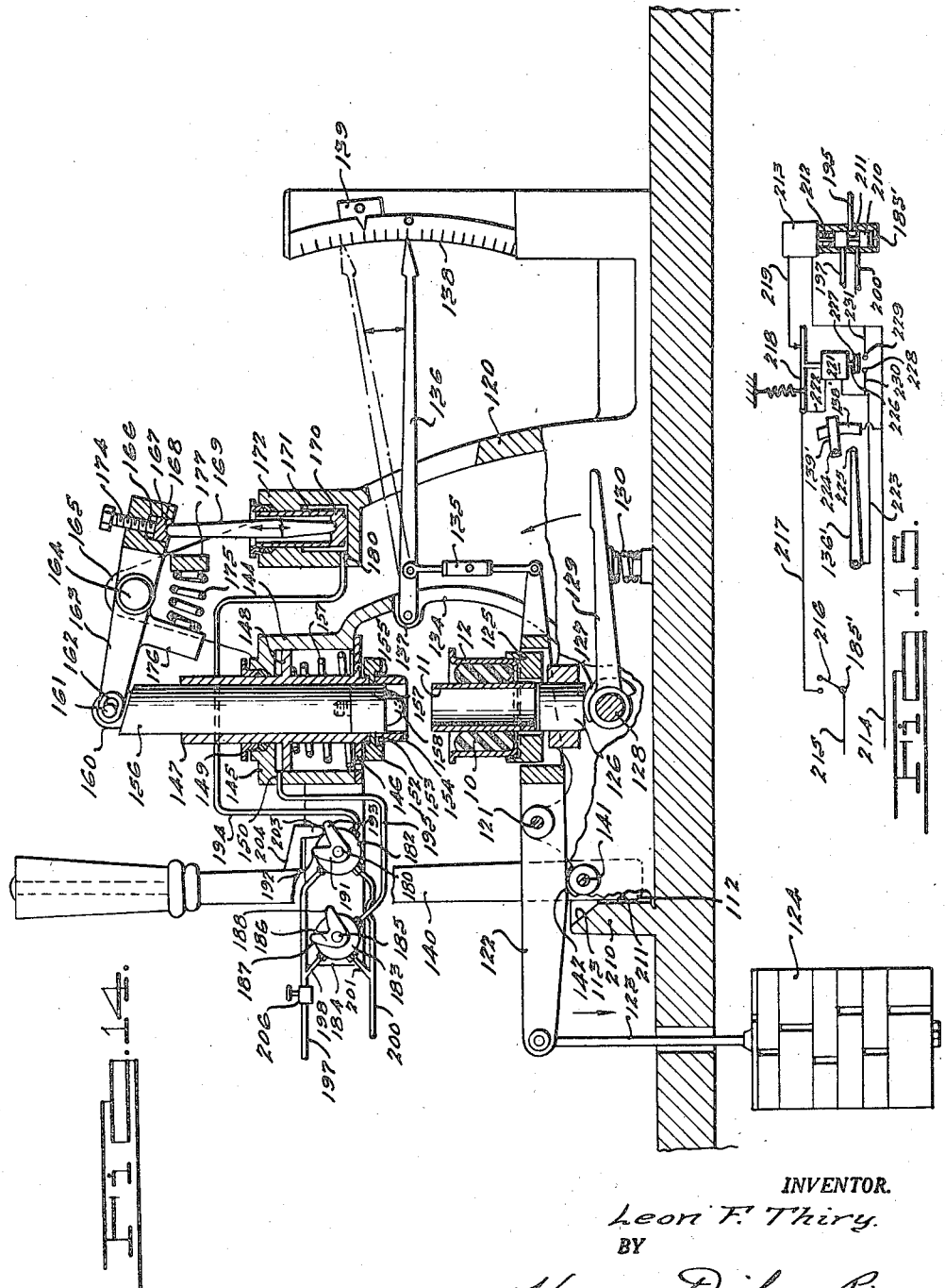
INVENTOR.
Leon F. Thiry.
BY
Harness, Dickey & Pierce.
ATTORNEYS.

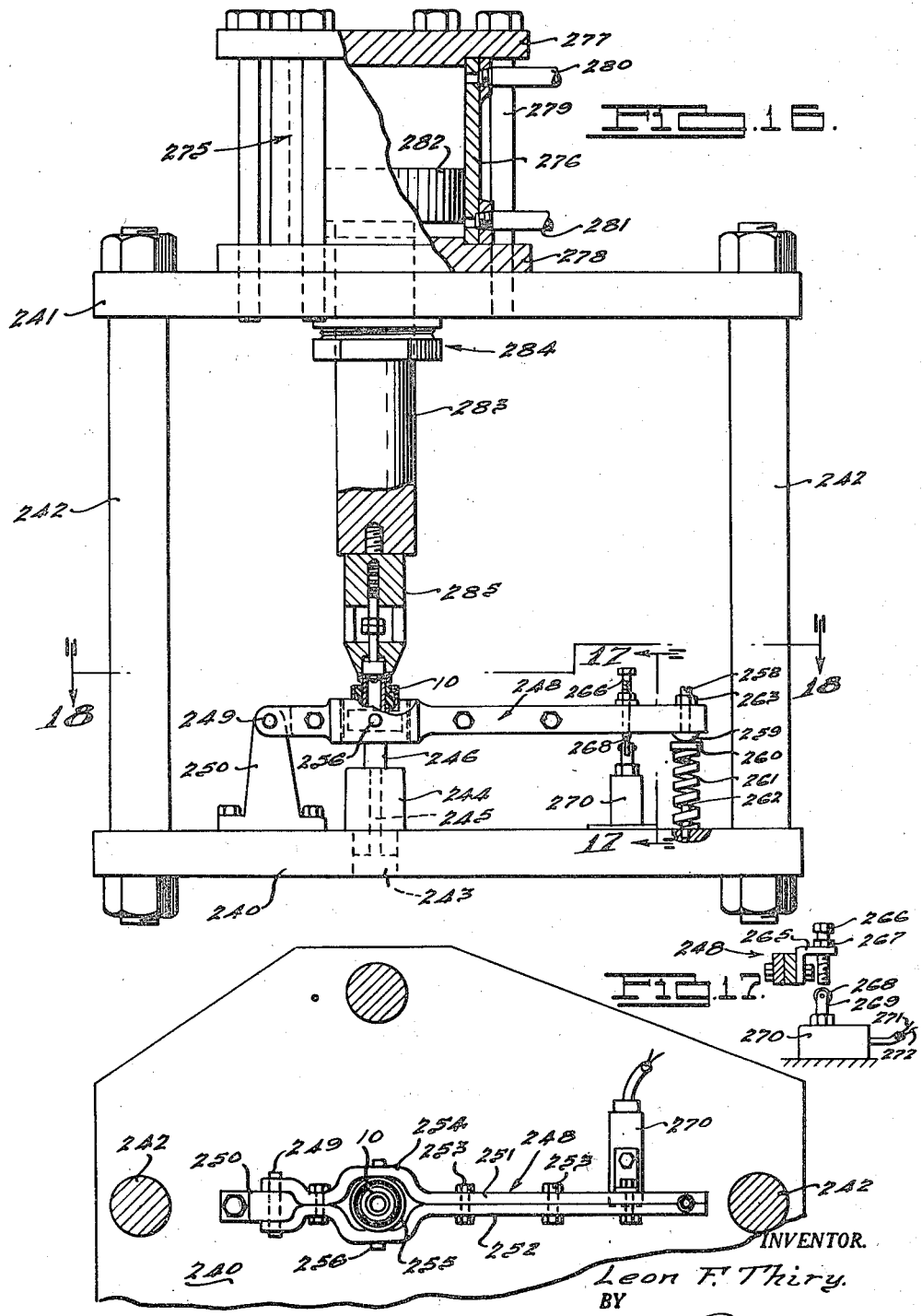

Aug. 10, 1948.   L. F. THIRY   2,446,621
METHOD OF MAKING PRECISION
ANTIVIBRATION MOUNTINGS
Filed Dec. 3, 1943   6 Sheets-Sheet 5
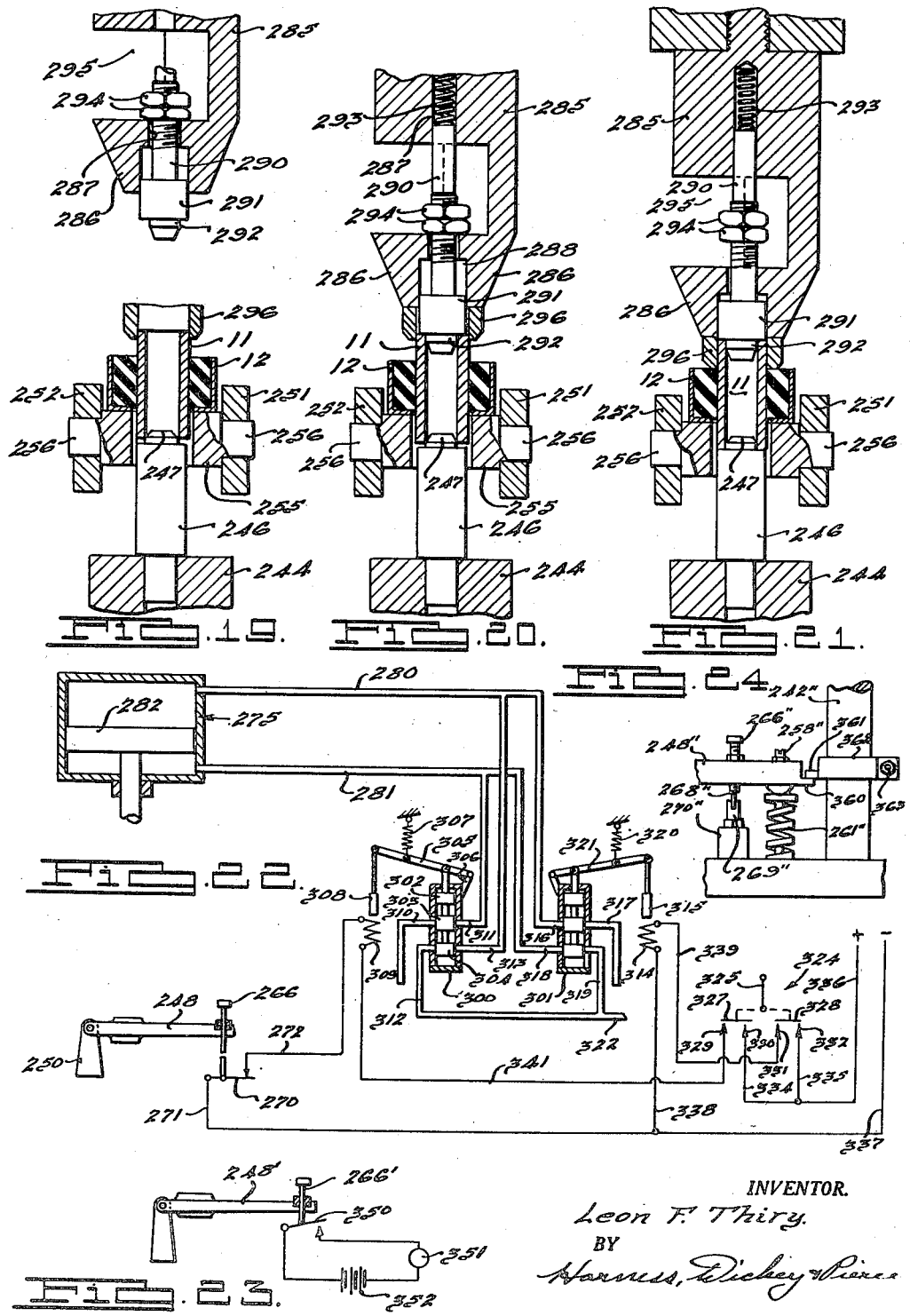
INVENTOR.
Leon F. Thiry.
BY
Harness, Dickey & Pierce
ATTORNEYS.

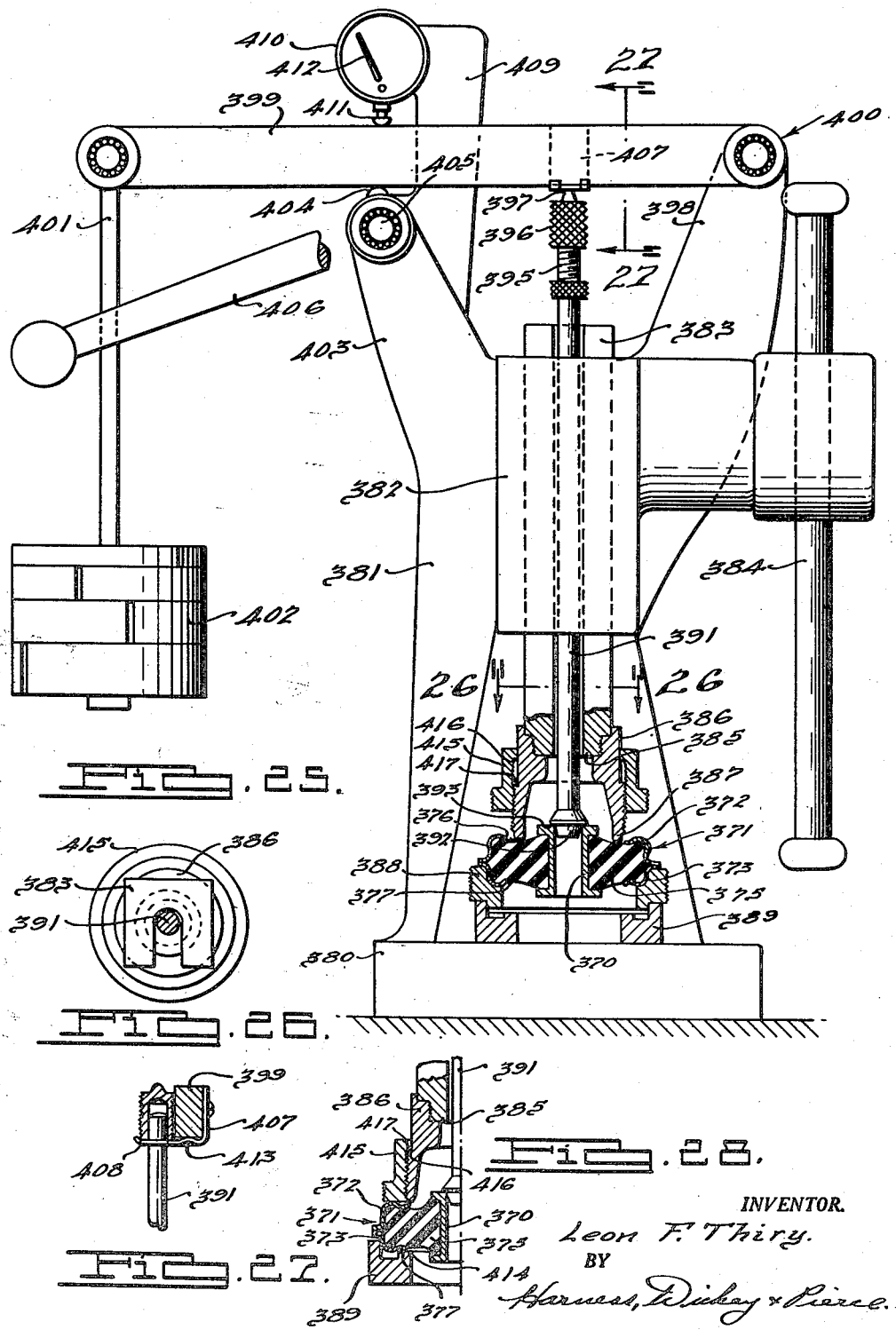

Patented Aug. 10, 1948

2,446,621

UNITED STATES PATENT OFFICE 2,446,621

METHOD OF MAKING PRECISION ANTI-VIBRATION MOUNTINGS

Leon F. Thiry, Montclair, N. J., assignor to The General Tire & Rubber Company, Akron, Ohio, a corporation of Ohio Application December 3, 1943, Serial No. 512,841

17 Claims. (Cl. 29—148.2)

1

The present invention relates to vibration mountings of the type employing a pair of relatively rigid members formed of metal, or the like, which are separated by a layer of rubber and in which the principal vibration is absorbed by relative movement between the rigid members in substantially parallel paths. Such mountings may comprise either a pair of spaced concentric members separated by an annular sleeve or ring of rubber or they may comprise two or more relatively flat plates separated by layers of rubber. The term "rubber" as used herein is intended to include both natural and synthetic rubber.

For many purposes it is essential to successful vibration dampening to employ vibration mountings having accurately calibrated deflection rates; that is to say, the amount of displacement of one of the members of the mounting with respect to the other for any given load must fall within narrow limits. The deflection characteristic of any given mounting is a function of many factors, including the size of the various parts, the thickness of the rubber layer and the hardness of the rubber. The deflection characteristic of mountings is also altered by the provision of flanges or bumpers adapted to engage the edge of the rubber layer and resist relative movement of the rigid members parallel to each other. It is also possible to change the deflection curve under various loads by altering the form and size of such a flange or bumper. While for any given installation all of these factors may be selected to produce a mounting of the desired characteristics, nevertheless in actual commercial production the tolerances permitted in the size of the parts, composition and hardness of the rubber and other factors result in a relatively wide variation in the deflection characteristics of mountings that are apparently of identical construction.

Accordingly, it is the general object of the present invention to provide methods of and apparatus for adjusting the deflection characteristics of vibration mountings after they are assembled in order to produce a mounting having the desired deflection rates.

More specifically, it is the object of the present invention to provide methods of and apparatus for producing a mounting having the desired deflection characteristics by permanently changing the location of one or more of the bumper flanges in the assembled mounting to a predetermined degree.

Other and more detailed objects and advantages of the invention will become apparent from the following specification, the drawings relating thereto and the claims hereinafter set forth.

In the drawings, in which like numerals relate to corresponding parts in the several views throughout:

Figures 1, 2 and 3 illustrate three slightly different types of vibration mountings of the concentric cylindrical sleeve type equipped with annular bumper flanges;

Figures 4, 5 and 6 illustrate three stages in the operation of press-fitting an annular bumper on the inner cylindrical sleeve of a mounting of the type shown in Figures 1, 2 and 3;

Figure 7 shows in fragmentary manner apparatus for determining the proper location of a press-fitted bumper element during the press-fitting operation;

Figure 8 shows a slightly different form of bumper construction, together with a die adapted to alter its form and location;

Figure 9 is a graph showing the manner in which the deflection groove of a mounting may be varied by varying the position of the bumper flanges;

Figure 10 is a side elevation with parts in section of a hand operated machine for press-fitting an annular bumper sleeve on the inner cylindrical sleeve of a mounting to the extent required to produce a mounting of exactly the desired deflection characteristic;

Figure 11 is a fragmentary section taken on the line 11—11 of Figure 10;

Figure 12 is a fragmentary section taken on the line 12—12 of Figure 11;

Figure 13 is a fragmentary section taken on the line 13—13 of Figure 10;

Figure 14 is a side elevation with parts in section of a machine similar to that illustrated in Figure 10 but adapted to operate by hydraulic pressure under the control of the operator;

Figure 15 is a diagrammatic illustration of means adapted to be incorporated in the machine of Figure 14 to effect an automatic stoppage of the bumper moving operation;

Figure 16 is a side elevation with parts in section of a further modified form of apparatus for carrying out the method of the present invention;

Figure 17 is a fragmentary section taken on the line 17—17 of Figure 16;

Figure 18 is a horizontal section taken on the line 18—18 of Figure 16;

Figures 19, 20 and 21 are enlarged vertical section views of a portion of the machine in three different stages of the cycle of operation;

Figure 22 is a diagrammatic illustration of a suitable form of electromagnetically controlled hydraulic circuit for controlling the operation of the apparatus of Figure 16;

Figure 23 is a fragmentary diagrammatic illustration of a signaling circuit for use in connection with the machine of Figure 16;

Figure 24 is a fragmentary illustration showing a further modification of the mechanism illustrated in Figures 16 to 22;

Figure 25 shows a further modified form of the apparatus particularly adapted either to decrease or increase the deflection resistance of the mounting;

Figure 26 is a section taken on the line 26—26 of Figure 25;

Figure 27 is a fragmentary section taken on the line 27—27 of Figure 25; and

Figure 28 is a fragmentary section corresponding to Figure 25, showing a portion of the machine adjusted to increase the deflection resistance of a vibration mounting.

In Figures 1 to 3 there is illustrated one form of vibration mounting to which the present invention is applicable, namely, a mounting comprising a pair of concentric members in the form of cylindrical sleeves separated by an annular ring of rubber. As shown in Figure 1, the annular rubber ring 10 is positioned between an inner sleeve 11 and an outer sleeve 12. The rubber is preferably held in position by a mechanical bond; that is to say, by the pressure induced by distorting a vulcanized ring of rubber which, in its free state, is of the form illustrated in the superimposed dotted outline 13 on Figure 1. The rubber ring is compressed readily and allowed to expand axially to the final assembled form illustrated in solid lines, and the tendency of the rubber to return to its initial form creates a strong mechanical bond between the rubber and the cylindrical sleeves. While this type of bond is preferred, it will be appreciated that the rubber ring may be bonded in the final form by vulcanization, if desired. In this type of vibration mounting, the principal freedom of movement between the sleeves is in an axial direction. In order to restrict relative axial movement between the two sleeves, it is customary to provide bumper rings or flanges, such as the ring 14 press-fitted at the upper end of the inner sleeve 11 and the inturned flange 15 formed on the lower end of the outer sleeve 12.

In the mounting of Figure 1, the bumpers are provided only on the upper end of the inner sleeve and the lower end of the outer sleeve, inasmuch as the mounting is intended to act as a support for a member mounted on the inner sleeve and, consequently, the principal forces are acting in a downward direction on the inner sleeve and an upward direction on the outer sleeve. It will be appreciated that the bumper rings or flanges may both be formed in the manner of the flange 15 in Figure 1, or, as shown in Figure 2, the flange 15a on the outer sleeve may be formed as a press-fitted ring. Where the mounting is to sustain forces which act substantially equally in opposite directions, bumpers, such as the bumpers 14 and 15a in Figure 3, are provided on both ends of both sleeves.

Due to tolerances in the outside diameter of the inner sleeve, the inside diameter of the outer sleeve and in the size of the rubber ring in its free state, it is found that there are unavoidable variations in the axial extent of the distorted rubber ring 10 in the finally assembled mounting.

These variations result in a variation between the deflection of different mountings under a given load. In addition, unavoidable and minor variations in the composition or hardness of rubber likewise result in different deflection rates for different mountings which are otherwise apparently identical.

In accordance with the present invention, these variations are corrected and a plurality of mountings having identical deflection characteristics is readily produced by adjusting the position of one or more of the bumper rings of the mounting after the rubber ring is inserted between the two sleeves. The effect of such adjustments is best illustrated in the chart, Figure 9, in conjunction with the fragmentary illustrations in Figures 4 to 6, inclusive.

Figure 9 shows a graph of axial force acting upon one of the sleeves plotted against the axial deflection of that sleeve with respect to the other sleeve. The axial deflection curve for any given mounting varies widely in form, depending upon the proportions of the various parts, but the curves illustrated in Figure 9 are generally representative of the nature of the changes in deflection rate that can be achieved by adjusting the position of the bumper rings. The lowermost curve 20 represents the deflection curve of a mounting of the type mentioned when no bumpers are employed. If after assembly a bumper ring, such as the ring 21 in Figure 4, is press-fitted on the inner sleeve 11 by means of the plunger 22 of a suitable press until the ring assumes the position shown in Figure 4, in which it is spaced slightly from the end of the rubber ring 10, the deflection curve for the mounting will be for a portion of its length identical to the mounting having no bumpers, but after the rubber contacts the bumper ring the resistance to deflection will increase, with the result that the deflection curve will assume a form somewhat like that shown at 24 in Figure 9.

By pressing the bumper ring 21 onto the inner sleeve until it just touches the rubber ring 10, as shown in Figure 5, a deflection curve represented by the line 25 in Figure 9 may be secured. The stiffness of the mounting may be further increased, with the result that it has a deflection curve such as that illustrated at 26 in Figure 9, by forcing the abutment ring 21 to a further extent onto the inner sleeve 11, as best shown in Figure 6. It will be apparent, therefore, that it is possible to increase or decrease the stiffness of any given mounting by adjusting the position of the bumper, as above described, over a much wider range than the unavoidable variations in stiffness which result from tolerances of manufacture.

In carrying out the method of the present invention the deflection resistance may be either increased or decreased, depending upon the direction in which the bumper is shifted, but, inasmuch as it is somewhat easier to move the bumper toward the rubber, it is preferred to design and construct the mountings to have resistance to deflection for their rated load slightly less than that desired in the final mounting. In such case, as a last step in the manufacture, one or more of the bumpers is adjusted in position to increase the stiffness of the mounting to the degree necessary to produce a mounting of the desired deflection characteristic.

For some purposes, where it is determined that the desired deflection characteristic can be achieved with the required accuracy by adjusting the flange until it just contacts the end of the rubber ring, it is possible to carry out the method in an ordinary hand-operated or manually controlled mechanical press which will force a press-fitted ring onto one of the mounting members until the desired relationship is achieved. The operator may, by inserting a very thin feeler gauge between the end of the rubber and the bumper, ascertain when the bumper has just contacted the rubber. If a slight space between the rubber and the bumper is desired, a feeler gauge of appropriate thickness can be employed and the pressing operation stopped when the bumper reaches the desired position.

In Figure 7 is illustrated a fixture for determining the proper location of a bumper particularly adapted for use in cases where the bumper is forced into the body of rubber, as indicated in Figure 6, to produce a stiffness represented by the line 26 on Figure 9. In Figure 7 numeral 30 represents the bed of an ordinary press having a plunger 31 adapted to force the abutment ring 32 onto the inner sleeve 11 of the mounting. Mounted on the bed 30 of the press is an upright post 33 having a hinged section 34 at its upper end, upon which is mounted a conventional form of dial indicator of the type commonly used for indicating minute dimensional variations. An arm 36 pivoted at 37 on the member 34 underlies the plunger 38 of the dial indicator and has a downwardly bent extremity carrying a button 39, which rests upon the upper end of the rubber ring 10 of the mounting. As a result of this arrangement, as the bumper ring 32 is forced downwardly beyond the point at which it first contacts the rubber ring 10 it will cause an upward flow or extrusion of the rubber in the manner illustrated in Figure 6, which will tend to lift the button 39 and lever 36, thereby raising the plunger 38 of the indicator and causing the pointer of the indicator to traverse the dial, thereby giving an indication of the amount which the upper end of the rubber ring has been elevated. By stopping the operation of the press after the rubber ring has been elevated by a predetermined amount, it is possible to obtain mountings of relatively uniform deflection characteristics.

The fixture illustrated in Figure 7 may also be employed in the same manner in connection with mountings in which the bumper is an integrally formed flange on one of the sleeves. Thus, in the case of such a mounting illustrated in Figure 8, the inwardly bent flange 42 on the inner sleeve 43 may be bent downwardly to a greater extent by means of a die 44 of appropriate shape which is mounted upon the plunger of the press. The die 44 has a stem 45 which will project entirely through the inner tubular member 43 before any deformation of the flange 42 occurs, thus preventing collapse of the inner tubular member, which is supported on a support 46. The operator, as in the case of the mechanism illustrated in Figure 7, will cause the die 44 to move downwardly until the upward extrusion of the rubber ring reaches the predetermined amount, as indicated by the dial indicator of Figure 7.

In Figure 10 is illustrated a mechanism for adjusting a bumper to the desired point for use in cases where it is necessary to produce mountings whose deflection rates are very accurately calibrated. In this mechanism control means are provided which gives a direct reading of the amount of deflection under a rated load throughout the bumper moving operation, thus enabling the operator to stop the machine when the deflection reaches the desired value.

Referring to Figure 10, the mechanism comprises a U-shaped frame 50, the lower leg 51 of which forms the base of the machine and the upper leg 52 of which supports a hand-operated screw press. While the mechanism of the press may take any suitable or conventional form, there is shown, for purposes of illustration, a press comprising a hand wheel 53, the hub of which is threaded upon a threaded arbor 54 the upper end of which is reduced at 55 and fitted within an opening 56 in the upper leg 52 of the frame. Any suitable means may be provided for fixing the stem of the arbor 54 in the opening 56 against movement relative to the frame.

Mounted on the lower side of the hub of hand wheel 53 is a thrust bearing assembly comprising a pair of plates 57 and 58 separated by roller bearings and held in assembled relation by means of a housing 59, which is fixed at its upper end to the hub of the hand wheel. The lower face of the plate 58 is provided with a recess 60 adapted to receive the annular bumper 61, which is to be press-fitted on the inner sleeve 11 of the mounting. A ring of rubber 62 may be provided within the recess 60 to grip the bumper 61 and hold it in position prior to the press-fitting operation. In some cases it may be preferred to start the press-fitting operation in another press and complete the operation in the machine of Figure 10. In that case the bumper will be on the sleeve 11 when the mounting is placed in the machine and it will be unnecessary to provide the recess 60 or its rubber ring 62.

The threaded arbor 54 is provided with a central bore 63 having a countersunk enlargement 64 in its lower end. Positioned within the countersunk enlargement 64 is a clamping plunger 65 which projects freely through suitable openings in the plates 57 and 58 of the thrust bearing and is adapted to pass freely through the bumper ring 61. The lower end of the plunger 65 is provided with a rounded pilot projection 66, which is adapted to enter the upper end of inner sleeve 11 and bring the sleeve into proper alignment with the plunger 65. The annular shoulder 67 on the lower end of the plunger 65 is adapted to abut the upper end of the sleeve 11 and hold the sleeve against its lower support, hereinafter described.

Plunger 65 is connected to a rod 68, which passes through the bore 63 in the arbor 54 and carries at its upper end a nob or handle 69. The upper end of the reduced portion 55 of the arbor is split and provided with a pair of projecting ears 70 and 71, as best shown in Figure 12. A bolt 72 passes through the ears 70 and 71, and threaded on the opposite end thereof is a nut 73 carrying a handle 74 for rotating the same. The arrangement is such that when the handle 74 is raised into the dotted line position shown in Figure 10 the rod 68 will be released, thereby permitting the rod and its attached plunger 65 to drop by gravity into the lower dotted line position shown by Figure 10, in which position the pilot line 66 has entered the sleeve 11 and the plunger is resting on the top edge of the sleeve. In this position, the rod 68 may be clamped by pulling the handle 74 downwardly into the solid line position illustrated. When the plunger and rod 68 are in their upper positions, they may also be held against downward movement by shifting the handle 74 to its lower position, thereby clamping the rod 68 within the split upper end of the reduced portion 55 of the arbor.

The outer sleeve 12 of the vibration mounting is adapted to rest upon an annular ring 80, which is pivotally mounted on a lever 81, which, in turn, is journaled on a pin 82 carried by the base portion 51 of the frame. Roller bearings 83 are preferably employed at this pivot to reduce friction. The pivotal connection between the ring 80 and the lever 81 is of such character as to permit limited pivotal movement of the ring 80 with reference to the lever 81 about an axis perpendicular to the paper in Figure 10 and intersecting the axis of the mounting. This pivotal connection comprises a pair of projections 84 projecting inwardly from opposite sides of a circular opening 85 of lever 81 within which the ring 80 is positioned. The upper surfaces of the projections 84 are V-shaped, as best shown in Figure 12, and are thus adapted to act as fulcrums for the ring 80. The ring 80 is provided with a pair of inverted U-shaped projections 86 having the notches 87 adapted to receive the fulcrums 84. The internal angle of the V notch 87 is slightly greater than the internal angle of the V-shaped projection on the fulcrum 84, with the result that a limited pivotal movement of the ring 80 with respect to the lever 81 is permitted.

The lever 81 projects to the left of its pivot 82 and at its extremity carries a pivoted rod 90 adapted to support a plurality of weights 91 of the type frequently employed in weighing scales.

The right-hand extremity of the lever 81 is connected by means of a turnbuckle linkage 92 to a pointer 93, which is pivoted at 94 on the frame 50 and is adapted to move over a scale 95. Means are provided for holding the lever 81 against movement in response to the force exerted by the weights 91. This means comprises a shaft 96 journaled on the frame portion 51 and having fixed thereto a member 97 having a projection 98, which, in the rotative position of the shaft illustrated in the drawings, engages beneath the left-hand end of the lever 81 and holds that end of the lever against downward movement in response to the force exerted by the weights. A handle 99 fixed to the shaft 96 is provided for moving the projection 98 out of contact with the lever 81 and thus permitting the weights to take effect. The turnbuckle 92 is so adjusted that the pointer 93 is on the zero point of the scale 95 when the stop 98 engages the left-hand end of lever 81.

The lower end of the inner sleeve 11 of the mounting projects through the central opening in the ring 80 and is adapted to engage a cylindrical supporting element 102, which is slidable within a cylindrical opening 103 carried by the frame portion 51. Beneath the cylindrical supporting member 102 is located a horizontal shaft 104 journaled in the frame portion 51 and carrying an eccentric cam 105, which is adapted to engage the lower end of the cylindrical supporting member 102. A handle 106 is fixed to the shaft 104 and carries a weight 107, which is adjustable along the length of the handle in any suitable manner, as by a set screw 108, which may be threaded into engagement with the handle at the point it passes through an opening in the weight 107. The arrangement of the weighted handle and the eccentric cam is such that when the handle 106 is shifted to the left, as shown in solid lines in Figure 10, the upper end of the cylindrical support 102 is out of contact with the lower end of the inner sleeve 11. When the handle is swung counterclockwise about the shaft 104, the eccentric cam 105 elevates the cylindrical support 102 into contact with the lower end of the sleeve 11. The weight 107 is so adjusted on the handle 106 that it will exert sufficient turning force to elevate the cylindrical member 102 into engagement with the sleeve 11. The angle of the cam 105 is such that no amount of force exerted on the top of the cylindrical member 102 will cause the cam to rotate in a direction to lower the member 102.

The sliding support 102 and the eccentric cam and handle arrangement are provided solely for the purpose of automatically compensating for unavoidable variations in the distance between the lower end of the outer sleeve 12 and the lower end of the inner sleeve 11 of the mounting. If this distance in the manufacture of mountings is accurately maintained at the same value, the supporting member 102 may be fixed in such a position that it will just contact the lower end of the sleeve 11 when the outer sleeve rests on the ring 80 and the stop 98 is engaged below the left-hand end of lever 81. In this case, the eccentric cam and handle for operating the same may be omitted and the support 102 may be fixed in the desired position.

The operation of the mechanism shown in Figures 10 to 13 is as follows. With the parts of the machine in the solid line positions illustrated, a mounting is placed upon the annular ring 80 in the position shown and the handle 74 raised to release the rod 68 and permit the plunger 65 to fall by gravity into contact with the upper end of sleeve 11. As soon as this has been achieved, handle 74 is lowered to lock the plunger 65 in position. The weight of the plunger and rod 63 is not sufficient to cause any significant axial deflection of the inner sleeve relative to the outer sleeve of the mounting. As soon as the plunger 65 is clamped in its lower position, the lever 106 is swung counterclockwise toward the dotted line position in order to elevate the supporting member 102 into engagement with the lower end of the inner sleeve 11. This positively locks the inner sleeve 11 in a fixed position. Stop 98 is then moved out of contact with the left-hand end of lever 81 by swinging handle 99 counterclockwise, thus permitting the force exerted by the weights 91 to exert a counterclockwise rotative force upon the lever 81. The only resistance to such rotation of the lever 81 at this time will be the resistance offered by the rubber ring 10 positioned between the sleeves 11 and 12 of the vibration mounting and, consequently, the lever 81 will rotate by an amount which accurately measures the axial deflection between the sleeves incident to the axial load applied by means of the weights 91 and the lever 81 to the lower end of the sleeve 12. The amount of this deflection will be indicated by the position of the pointer 93 on the scale 95. This deflection will purposely be slightly greater than that desired and, consequently, the pointer will assume a dotted line position at a point on the scale above that marked by the adjustable indicator 110, which is set at the desired deflection for the load employed. The operator is now ready to begin the operation of pressing the annular bumper 61 onto the inner sleeve 11, which operation is accomplished by rotating the hand wheel 53, thereby forcing the plate 57 of the thrust bearing downwardly and causing the ring 61 to be press-fitted onto the upper end of the sleeve 11. As the operator continues the pressing operation he observes the pointer 93 and the operation is stopped at the instant that the pointer reaches the point on the scale marked by the adjustable slide 119. All of the parts of the machine may be then returned to their original positions in the reverse order and the mounting removed from the machine. The mounting will then be complete except that it will usually be necessary to trim off an excess projection on the bumper ring 61 in order to produce a flush end on the inner sleeve 11.

While the machine illustrated in Figure 10 is constructed for use in press-fitting separate abutment sleeves on the inner sleeve of the mounting, it will be apparent that it may be readily adapted to press an abutment ring on the outer sleeve. Moreover, in place of pressing the separate abutment ring on one of the sleeves of a mounting, the machine may be equipped with a die similar to the die 44 in Figure 8 for the purpose of changing the position of an integral abutment flange on either of the sleeves. In this case, the stem 45 of the die 44 in Figure 8 will be substituted for the plunger 65 of Figure 10, and the flange bending portion of the die will be made as a separate annular piece secured to the plate 58.

In Figure 14 is illustrated a hydraulically operated mechanism generally similar to that illustrated in Figure 10 but employing an external source of hydraulic power for its operation. In this machine the control means may either operate an indicator which will indicate to the operator when the machine should be stopped, or it may, as shown in Figure 15, automatically stop the machine when the deflection characteristic of the mounting reaches the desired value.

The machine of Figure 14 includes a generally U-shaped frame 120, which, as illustrated is of hollow cast construction. Pivoted on a pin 121 fixed to the frame 120 is a lever 122 similar in construction and operation to the lever 81 of Figure 10. The left-hand end of lever 122 is pivotally connected to a rod 123, which supports a plurality of weights 124.

To the right of pivot 121 lever 122 pivotally supports a ring 125, which is similar in construction and mode of operation to the ring 89 of Figure 10 and which is adapted to support a vibration mounting of the type under consideration by engagement with the lower end of the outer sleeve 12 of the mounting. The inner sleeve 11 of the mounting projects through a central opening in the ring 125 and is adapted to engage a cylindrical supporting element 126, which rests upon a spiral cam 127 pivoted on a shaft 128 carried by the frame.

Fixed to the cam 127 is a lever 129, which is normally urged upwardly by a light spring 130. The spring 130 has sufficient strength to raise the lever and thereby elevate the cylindrical supporting element 126 into contact with the lower end of the sleeve 11, but is not sufficiently strong to lift the mounting from its position resting upon the ring 125.

The right-hand end of the lever 122 projects through an opening 134 formed in the inner side of the upright portion of the frame 120 into the interior of the hollow upright portion, and within the hollow frame it is connected by means of a turnbuckle link 135 to a pointer 136, which is pivoted between a pair of ears 137 formed on the frame at opposite sides of the opening 134. The pointer 136 is adapted to co-operate with a scale 138 having an adjustable indicator 139 associated therewith. At the left-hand side of the machine a hand lever 140 is fixed to the shaft 141, which, in turn, is journaled on the lower portion of the frame 120. The shaft 141 carries a stop 142 which engages beneath the left-hand end of the lever 122 and holds the lever against counter-clockwise movement in response to the force exerted by the weights 124. The arrangement of the stop 142 is such that it does not release the lever 122 until after the handle 140 has been swung counterclockwise through an arc sufficient to actuate the plunger operating mechanism hereinafter described.

Formed integrally with the upper portion of the frame 120 is a cylinder 144 having an integrally formed upper end wall 145 and a removable cylinder head 146. A hollow piston rod 147 extends through both ends of the cylinder and carries an integrally formed piston 148. The upper end of the cylinder is provided with any suitable or conventional form of packing gland 149 and a fluid inlet pipe 150. A spring 151 is provided within the cylinder for urging the piston 148 upwardly at all times, the spring being strong enough to elevate the piston and discharge the fluid in the upper end of the cylinder when the inlet 150 is connected to the low pressure return line, as hereinafter more fully described.

The lower end of the hollow piston rod 147 is threaded to receive a ring 152, which is provided with a counterbore 153 at its lower end adapted to receive an abutment ring 154 similar to the ring 61 of Figure 10 and rings 21 of Figures 4 to 6. The counterbore 153 is larger in diameter than the ring 154 and is provided with a ring 155, of rubber or the like, which serves to frictionally hold the ring 154 in position within the counterbore. As in the previous machine, if the ring 154 is partially pressed on the sleeve 11 prior to the final adjustment made in the machine of Figure 14, the counterbore 153 and the ring 155 may be omitted.

Mounted within the hollow piston rod 147 is a plunger 156, to the lower end of which is removably secured a head 157 having a rounded end portion 158 adapted to fit within the upper end of the inner sleeve 11 of the vibration mounting and align the mounting with the ring 154. The outer diameter of the plunger head 157 is substantially equal to the internal diameter of the ring 154, but will pass freely through the latter.

The machine may be adapted to operate upon abutment rings of various sizes by removing the ring 152 and the plunger head 157 and substituting a ring and plunger head of suitable dimensions.

The upper end of the plunger 156 is provided with an ear 160 carrying a transverse pin 161, which projects into the slightly elongated slot 162 in the end of a lever 163. The lower 163, in turn, is pivotally mounted upon a transverse pin 164, which extends between a pair of upstanding ears 165 on the upper portion of the frame 120.

The right-hand end of the lever 163 is provided with a generally downwardly extending cylindrical bore 166 containing a plunger 167 having a semispherical recess 168 in its lower end adapted to receive a piston rod 169, the lower end of which is seated within a semipherical recess 170 in the bottom of a sleeve-type piston 171 fitted within an upwardly opening cylinder 172 formed integrally with the frame 120. A set screw 174 is provided for adjusting the position of the plunger 167 in order to adjust the position of plunger 156 with reference to the piston 171.

A helical compression spring 175 is positioned between a downwardly projecting arm 176 on the lever 163 and a seat 177 formed integrally with and extending between the upstanding ears 165 of the frame 120. The action of the spring 175 is to urge the lever 163 at all times in a clockwise direction and thus keep the piston rod 169 in a state of compression between the plunger 167 and the piston 171. The lower end of the cylinder 172 is provided with a fluid inlet pipe 180 for admitting operating fluid to the cylinder and the spring 175 is sufficiently strong to return the cylinder 171 to its lowermost position and discharge the fluid in the cylinder when the inlet 180 is connected to the low pressure return line, as hereinafter described.

Any suitable hydraulic control mechanism may be employed to control the admission of fluid to cylinders 172 and 144. The particular means illustrated is adapted to operate these cylinders in succession, and their operation is correlated with the withdrawal of the stop 142 to the end that the stop will be withdrawn after the cylinder 142 and before cylinder 144 are operated. This means, as best shown in the drawings, comprises a pair of valves 182 and 183 which is mounted upon a panel 184 fixed in any suitable manner to the left-hand side of cylinder 144. Valves 182 and 183 are conventional valves of the type employing an internal rotary valve member mounted upon a stem which projects from the valve housing.

The stem 185 of valve 183 carries a V-shaped operating member 186 having a pair of fingers 187 and 188 extending at an angle of approximately 90° to each other. The stem 190 of valve 182 carries a similar V-shaped operating member 191 having fingers 192 and 193. The panel 184 with the two valves and their operating members 186 and 190 are located to the rear of the plane of movement of the operating handle 140, as viewed in Figure 14, the handle being broken away to show the valves.

Valve 182 controls the operation of cylinder 172, to which it is connected by means of a pipe or conduit 194 that extends from the valve to the inlet port 180 of the cylinder. Similarly, valve 184 controls the operation of cylinder 144, to which it is connected by means of pipe or conduit 195 that is connected to the inlet port 196 of cylinder 144. The pipe 197, which is connected to any suitable source of fluid under pressure, not illustrated, is connected to the valve 182 and by a branch line 198 to the valve 183.

An exhaust or return line 200, which is connected to any suitable low pressure reservoir of fluid, is also connected to the valve 182 and, by a branch line 201, to the valve 183. The construction of the valve 182 is such that when the stem 190 and the stem operating member 191 are in the position illustrated in Figure 14, communication through the valve is provided between pipe 200 and pipe 194 while the pressure line 197 is blocked at the valve 182. When the stem 190 is rotated counterclockwise through an angle in the order of 90°, the valve connects pressure line 197 to conduit 194 and the line 200 is blocked at the valve. Valve 183 is identical in construction, and in the position illustrated it connects pipes 201 and 195 while blocking line 198. When the stem 185 is rotated counterclockwise approximately 90°, valve 183 connects lines 198 and 195 while blocking line 201.

Valves 182 and 183 are operated by a finger 203 carried by an arm 204 which projects rearwardly from and is fixed to the handle 140, with the result that the downwardly extending finger 203 lies in the plane of the valve operating members 186 and 191. As a result of this arrangement, when the handle is shifted to the right into its stop position illustrated finger 203, by engaging fingers 188 and 193 of the valve operating members 186 and 191, shifts both valves to the positions illustrated in which they connect both cylinders to the low pressure return line.

When the handle is shifted to the left, as viewed in Figure 14, finger 203 will first contact finger 192, thus shifting the valve 182 to a position in which it connects cylinder 172 to the pressure line 197. Thereupon, further movement of the handle 140 to the left will cause the finger 203 to engage the finger 187 and shift valve 183 to a position in which it connects cylinder 144 to the pressure line 197. The stop 142, which is also movable with the handle 140, is so positioned that it will release lever 122 intermediate the shifting of valves 182 and 183 during counterclockwise movement of the handle 140.

In order to provide a slow downward movement of the piston 148 without affecting the speed of return movement of the piston, any suitable form of throttle or speed control valve, such as the valve indicated diagrammatically at 206, may be employed in the pressure line 197. Valve 206, by throttling the flow of fluid under pressure, will cause the piston 148 to move slowly in a downward direction, but since the return line 200 is not restricted the return movement of the piston 148 under the influence of spring 151 will be rapid.

The operation of the mechanism shown in Figure 14 is as follows. The operator, after inserting the abutment ring 154 within the recess in ring 152 with his right hand, places his right hand on lever 129, thus forcing it downwardly against spring 130, and at the same time rests the vibration mounting on the ring 125.

As soon as the mounting is in place, the operator's right hand is removed from the lever 129, thus permitting the spring 130 to lift the lever and raise the cylindrical supporting member 126 into contact with the lower end of the inner sleeve 11. The operator then with his left hand swings the handle 140 to the left, which movement first shifts valve 182, thus admitting fluid under pressure to cylinder 172 and causing the plunger 156 with its head 157 to move downwardly. The rounded pilot end 158 on the head 157 enters the upper end of the inner sleeve 11 and thus properly locates the sleeve in alignment with the abutment ring 154. To facilitate this action the permissible pivotal movement of ring 125 relative to lever 122 is not sufficient to permit the upper end of the mounting to tilt so far that the pilot 158 cannot enter sleeve 11. Continued movement of the handle 140 to the left withdraws the stop 142 from beneath the lever 122 and thereafter shifts valve 183 to permit fluid under pressure to enter the upper end of cylinder 144, thus causing the piston 148, ring 152 and the abutment sleeve 154 to move downwardly and press fit the abutment ring upon the upper end of sleeve 11.

The arrangement of the stop 142 is such that it holds the lever 122 in such a position that the pointer 136 is at the zero point on the scale 138. When the supporting cylinder 126 is elevated by lever 129 into contact with the lower end of sleeve 11, member 126 constitutes a fixed support which positively rotates the sleeve 11 in such a position that at no load on the outer sleeve 12 will the pointer 136 remain at the zero position on the scale 138.

When the plunger 156 moves downwardly against the upper end of sleeve 11, the force exerted by the plunger cannot cause a downward movement of the supporting member 126 because the angle of the cam 127 is insufficient to permit a return movement. Consequently, when the lever 122 is released and the load induced by weights 124 applied to the outer sleeve 12 of the mounting, the pointer 136 will move upwardly on the scale 138 and accurately indicate the total axial deflection of the sleeve 12 under the influence of the force applied. As previously indicated, this deflection, in the normal case, will be slightly in excess of that desired and, consequently, the operator will permit the downward movement of the piston 148 until the pointer 136 swings downwardly to the point indicated by the adjustable slide 139 on the scale 138, the position on the slide indicating the desired deflection.

As soon as the pointer reaches this position, the handle 140 is swung to the right, thus shifting valve 183 and connecting the upper end of the cylinder 144 to the low pressure return line 200. This immediately results in the return of the piston 148. Continued movement of the handle 140 to the right shifts the stop 142 into position beneath the lever 122, thereby raising the lever and relieving the load upon the mounting.

The final movement of the handle 140 to the right connects cylinder 172 to the low pressure line 200, thereby permitting the spring 175 to elevate the plunger and release the mounting. The parts are then in position to repeat the cycle of operation as just described on another mounting.

As previously indicated in connection with the mechanism of Figure 10, the mechanism of Figure 14 may also be employed to shift the position of integral abutment flanges, such as those illustrated in Figure 8. It is only necessary to connect the spindle 45 on the die 44 of Figure 8 to the plunger 156 and to connect the outer annular portion of the die 44, which will be a separate annular piece, to the hollow piston rod 147.

The left-hand end of the frame 120 is provided with a wall 210 having an internal vertical surface 211, which is adapted to engage the lower end 212 of the handle 140 in order to limit movement of the handle in a clockwise direction to the position illustrated in the drawings. The upper portion of the wall 210 is provided with an inclined surface 213 for limiting counterclockwise movement of the handle 140.

It will be appreciated that the details of construction of the mechanism may be varied widely without departing from the spirit of the invention. Thus, instead of employing springs to return the pistons 148 and 170, the cylinder and piston units may be made double-acting under the control of four-way reversing valves of conventional construction. In addition, the hydraulic control mechanism may incorporate any conventional form of means for giving the piston 148 on its downward stroke a high speed for the initial portion of the stroke and a low speed for the final portion, during which the press-fitting operation is performed.

In order to adjust the machine to accommodate mountings of different axial length, it is only necessary to insert suitable spacers between the outer sleeve 12 and the ring 125, or, if preferred, the vertical portion of the frame 120 may be made adjustable as to height in order to accommodate mounting of different lengths.

As previously indicated, the control means, instead of indicating to the operator when the mounting has the desired deflection characteristic, may automatically stop the machine and, accordingly, there is illustrated in a somewhat diagrammatic manner in Figure 15 a suitable electromagnetic means which may be incorporated in the machine of Figure 14 to accomplish that result.

Referring to Figure 15, there is shown a valve 183' which is substituted for the valve 183 of Figure 14 when automatic operation is desired. Valve 183 contains a spool 210 having a groove 211 for controlling flow of fluid through the valve. To the valve are connected the previously mentioned line 197 from a source of fluid under pressure and the line 200, which is a return line to a low pressure tank or reservoir. The spool 210 is normally held in its lower position illustrated in the drawings by means of a spring 212, but is shifted upwardly upon energization of a solenoid, indicated diagrammatically at 213. When the valve is in the position illustrated, line 195, which leads to the upper end of cylinder 144, is connected through the groove 211 to the low pressure return line 200. When the solenoid is energized and the spool elevated against the force of spring 212, communication between lines 195 and 200 is blocked and the fluid is free to flow from line 197 to line 195 in order to cause downward movement of the piston 148 of Figure 14.

The electrical energy for actuating the solenoid 213 is supplied from any suitable source of electric power by a pair of lines 214 and 215, line 214 being directly connected to one end of the solenoid coil and line 215 being connected to the other end through a switch 216, line 217, a switch 218 and line 219. Switch 216 comprises a movable switch element which is operatively connected in any suitable manner to the rotary shaft 185', which corresponds to the shaft 185 in the machine of Figure 14 and is operated in the same manner by means of the control handle 140 to close switch 216 when the handle 140 is shifted to its extreme left-hand position.

When the switch 216 is closed the circuit through the solenoid 213 is closed, thus energizing the solenoid and effecting a shift of the spool of valve 183' to its upper position, in which it blocks the return line 200 and connects line 197 to line 195 and thereby starts the downward or bumper moving stroke of the piston 148. During this operation the switch arm 218, which connects lines 217 and 219, is held closed by means of a spring 220.

Means are provided for opening switch 218 and thereby interrupting the circuit through the solenoid 213 when the deflection characteristic of the mounting reaches the desired amount. This means includes a solenoid 221 having an armature 226 which projects entirely through to the coil of the solenoid. The armature 226 is operatively connected to the switch 218 and the lower end of the armature 226 carries a bar 227, which is adapted upon downward movement of the armature to close an electric circuit between a pair of contacts 228 and 229. The circuit for the solenoid 221 includes a line 222, which connects to line 217, and a line 223, which is connected to the pointer 136', which corresponds to the pointer 136 of Figure 14.

The pointer in this case is made of electrically conductive material. An arcuate member 138' carries an adjustable slide 139' upon which is positioned a contact 224 adapted to co-operate with a contact 225 on the pointer 136'. The member 138' corresponds to the scale 138 of Figure 14, and the slide 139' corresponds to the adjustable indicator 139. The arcuate member 138' is electrically connected by means of a wire 231 to the line 214.

When the pointer 136' swings to a position in which the contact 225 engages the contact 224, it is apparent that the circuit through the solenoid 221 is completed from line 222 through the solenoid and thence through line 223, pointer 136', contacts 225 and 224, members 138' and 139' and line 231 to the line 214. The circuit thus completed energizes the solenoid and causes the armature 226 to move downwardly, opening switch 218 and engaging the bar 227 with the contacts 228 and 229. As soon as switch 218 is opened, the current is interrupted at the main solenoid 213 and the spool of valve 183' returns to the position shown in the drawings, thus stopping the operation of the press.

The contacts 228 and 229 and the bar 227 provide a holding circuit to insure that once the solenoid 221 is energized by engagement of contacts 224 and 225, it will remain energized until the manual switch 216 is opened. Thus, contact 228 is connected to the line 223 and contact 229 is connected to the line 214. As a result of these connections, current from the solenoid 221 may flow through line 230, conact 228, bar 227, contact 229 and line 231 to the line 214, even though the contacts 224 and 225 do not remain in engagement.

The operation of the machine of Figure 14, when it incorporates the automatic shut-off mechanism of Figure 15, is believed to be apparent from the above description. It may be noted that as in the case of the operation described in connection with Figure 14, the machine is started by swinging handle 140 to the left. The first portion of this movement, as previously described, shifts valve 182 to actuate the clamping plunger 156. Thereafter, further movement of the handle 140 withdraws the stop 142 and the final movement closes the switch 216. Between the time that the stop 142 is removed and the time that the switch 216 is closed by handle 140, the load will be applied to the sleeve 12 of the mounting, thus causing the pointer 136' to swing upwardly until its contact 225 is located above the contact 224. During the passage of contact 225 over the contact 224, solenoids 213 and 221 will remain inactive due to the opening circuit of switch 216. Thereafter, as soon as switch 216 is closed, solenoid 213 will shift valve 183' and start the operation of the press, which operation will continue automatically until interrupted by the solenoid controlled switch 218, which is actuated when the deflection characteristic of the mounting reaches the predetermined amount.

In Figures 16 to 22, inclusive, is illustrated a further modified form of apparatus for carrying out the invention of the present application. This form of mechanism is adapted for use on mountings in which the relative positions of the two rigid members of the mounting under no load conditions does not vary between different mountings. That is to say, in the case of mountings of the type illustrated in Figure 1 the apparatus is adapted for use where the lower end of the sleeve 11 and the lower end of the outer sleeve 12 are accurately held to a predetermined position with respect to each other measured axially of the mounting.

Referring to Figure 16, the apparatus comprises a bottom plate 240 and a top plate 241 connected by four bolts 242. The bottom plate is provided with an opening 243, in which is fitted a shouldered supporting member 244 having a central opening 245 passing therethrough. Fitted within the opening in its upper end and projecting upwardly from the member 244 is an arbor 246, which, as best shown in Figures 19 to 21, is adapted to engage the lower end of the inner sleeve 11 of a vibration mounting. The upper end of the arbor 246 has a reduced and tapered pilot 247 adapted to project within the sleeve 11 and thereby align the sleeve with the arbor. The pivoted arm 248 is pivoted on a pin 249 carried by an upstanding bracket 250 secured to the lower plate 240. The pivoted arm 248 is made up of a pair of bars 251 and 252, which are bolted together by a plurality of bolts 253 and are spread apart at 254 to receive an annular supporting ring 255, which is journaled on the arm 248 by a pair of trunnions 256, which project through suitable openings in the spread apart portions of the bars 251 and 252, as best shown in Figures 19 to 21.

At the extreme left-hand end of the arm 248, the bars 251 and 252 are again spread apart to embrace the upper end of the bracket 250, at which point the arm is pivoted to the bracket.

The annular supporting ring 255 is adapted to engage the lower end of the outer member 12 of the vibration mounting and thereby support the mounting. The right-hand end of the arm is provided with a set screw 258, which is threaded through the arm and carries at its lower end a rounded head 259, which bears upon a spring pad 260, which rests upon the upper end of a calibrated helical spring 261. The spring 261 at its opposite end seats against the lower plate 240 and is held in position by means of a pin 262, which is fitted within a suitable opening in the plate 240 and projects upwardly within the lower portion of the spring 261. The set screw 258 can be adjusted to change the position of the arm with respect to the spring 261 for a given load acting on the spring, and the set screw may be locked in position by means of a lock nut 263.

As best shown in Figure 17, an angle bracket 265 is secured to the rear side of the arm 248 and an adjusting screw 266 is threaded through the upper horizontal leg of the bracket 265 and is adapted to be locked in its adjusted position by means of a lock nut 267. The lower end of the adjusting screw 266 is adapted to engage a roller 268 carried by the plunger 269 of any suitable or conventional form of micro switch 270, which is adapted to control an electrical connection between a pair of wires 271 and 272. The detailed construction of micro switch 270 forms no part of the present invention, it being sufficient to state that it is of such character that upon a very minute downward movement of the plunger 269 the electrical connection between the lines 271 and 272 will be broken. Such switches are available in which the operative movement of the plunger is in the order of a few thousandths of an inch, or less. It is apparent, therefore, that with the construction so far described the circuit between the lines 271 and 272 will be broken when the arm 248 swings downwardly to a predetermined position, depending upon the adjustment of the screw 266.

The upper plate 241 carries a hydraulic cylinder 275, which is formed of a cylindrical barrel 276 and a pair of cylinder heads 277 and 278 held together by a plurality of bolts 279. A pair of pipes 280 and 281 leads to the upper and lower ends of the cylinder, respectively. Positioned within the cylinder is a piston 282 having a piston rod 283 which projects through a suitable packing gland, indicated generally at 284, secured to the lower cylinder head 278, the upper plate 241 being provided with an opening of suitable proportions to permit the packing gland to project through the plate. Mounted on the lower end of the piston rod 283 is a head 285, having a tapered lower nose portion 286 and a central bore 287, which is provided with an enlarged counterbore 288 at the lower end of the head.

A plunger 290 is mounted within the bore 287 and is provided with an enlarged head 291, which slides within and fits the counterbore 288. The lower end of the head 291 is provided with a reduced pilot portion 292 having a tapered end to facilitate its entry into the upper end of the inner sleeve 11 of the mounting in order to align the mounting with the head 286.

Plunger 290 is normally pressed downwardly to the position shown best in Figure 20 by means of a coil spring 293 positioned in the upper end of the bore 287. The plunger 290 is provided with a threaded portion intermediate its ends, which is adapted to pass freely through the lower portion of the bore 287 and which is adapted to receive a pair of lock nuts 294 for limiting downward movement of the plunger 290 with respect to the head 285 under the influence of the spring 293. The head 285 is provided with a transversely extending recess 295 which intersects the bore 287 intermediate its ends in order to provide a cavity within which the lock nuts 294 are located of sufficient size to permit the use of a wrench to tighten or adjust the nuts.

It will be noted that the lower end of the head 285 is adapted to engage the upper end of the annular abutment ring 296, the head 285 being so constructed that it is necessary to start the press-fitting of the abutment ring 296 upon the inner sleeve 11 before the mounting is placed within the machine of Figures 16 to 22. It will be obvious, however, that if it is desired to start the press-fitting operation of the ring 296 in the machine, it is only necessary to provide a retaining device for the ring 296 on the lower end of the head 285 in the manner illustrated in connection with the machine of Figure 14.

The operation of the apparatus so far described is as follows. The vibration mounting is inserted in the machine by resting it upon the supporting ring 255 in the manner illustrated best in Figure 19. At this time, the spring 261 is in its unloaded position, in which it is shifted by arm 248 to its uppermost position, in which the space between the lower end of the sleeve 11 of the vibration mounting and the upper end of the arbor 246, as best shown in Figure 19, is either equal to or slightly exceeds the desired deflection of the mounting under a rated axial load, the distance being controlled by proper selection of the length of the arbor 246.

In addition, the adjusting screw 266 is so adjusted in its bracket 265 that it engages and actuates the micro switch 270 when sleeve 11 is seated against arbor 246 and the relative axial displacement between the sleeve 11 and the outer sleeve 12 of the mounting is equal to the desired deflection at rated axial load. The spring 261 is likewise so chosen or adjusted that when the adjusting screw 266 actuates the micro switch 270 the spring 261 exerts, through arm 248, the rated axial load in an upward direction on the outer sleeve 12.

Once the adjustments are made, the machine is in condition for use and operation of the machine merely requires the admission of hydraulic pressure to the upper end of cylinder 275 to start the downward movement of the head 285. This movement presses the bumper or abutment ring 296 onto the inner sleeve. The force required to press the ring on the sleeve forces the inner sleeve downwardly against the upper end of the arbor 246 and thus deflects the two sleeves of the mounting relative to each other and applies a reacting force through the rubber ring 10 and the outer sleeve 12 on the arm 248. As the press-fitting operation continues, the abutment ring 296 engages the rubber ring and progressively increases the deflection resistance of the mounting.

This increase in the deflection resistance of the mounting increases the force exerted on the arm 248 by the outer sleeve 12 and eventually increases that force to such a point that the arm, through adjusting screw 266, actuates the micro switch 270. The micro switch 270, through means hereinafter described, automatically stops the press, thus producing a mounting of exactly the desired deflection characteristic. Subsequent mountings may then be placed in the machine and the cycle repeated without any further adjustments.

The means associated with the micro switch 270 for automatically stopping the press-fitting operation is best shown in the electrohydraulic circuit diagram of Figure 22. As there shown, there is provided a pair of dual electromagnetically operating shut-off valves, illustrated diagrammatically at 300 and 301. The two valves are identical and a description of one will suffice.

As shown, the valve 300 contains a spool having three lands 302, 303 and 304, the spool being normally held in the position illustrated by means of a lever 305 pivoted to a fixed bracket 306 and to the end of the spool and urged upwardly by a spring 307. The free end of the lever is connected in any suitable manner to an armature 308 of an electromagnet having a coil 309. In the position of the valve illustrated, the spool 303 blocks communication between a pair of lines 310 and 311, while spool 304 blocks communication between a pair of arms 312 and 313. Upon energization of the electromagnet, the armature or core 308 will be pulled downwardly, thereby shifting the spool downwardly and opening communication between lines 310 and 311 and also opening communication between lines 312 and 313.

Valve 301 is similar in construction and employs an electromagnetic coil 314 having an armature or core 315. In the closed position illustrated, valve 301 blocks all flow therethrough, but when the spool is shifted downwardly it opens communication between a pair of lines 316 and 317 and also between a pair of lines 318 and 319. The valve is normally held in closed position by the spring 320, which is connected with lever 321. Lines 312 and 319 are joined together and connected by means of a line 322 to any suitable source of hydraulic pressure, while lines 310 and 311 are connected to a low pressure reservoir or tank. Lines 316 and 313 are connected to the line 280 which leads to the upper end of cylinder 275, while lines 311 and 318 are connected to line 281, which leads to the lower end of the cylinder 275.

As the result of this arrangement, energization of the coil 309 opens valve 300 and admits fluid under pressure to the upper end of cylinder 275, while at the same time connecting the lower end of the cylinder through lines 281 and 311 through the valve in line 310 to the low pressure reservoir or tank.

When valve 300 is thus opened, it will be understood that valve 301 will remain closed, as illustrated. Conversely, when valve 300 is closed and valve 301 is opened by energization of the coil 313, fluid under pressure will be admitted to the lower end of cylinder 305 and the upper end of the cylinder will be connected to the low pressure tank or reservoir.

Suitable means are provided, including a switch indicated diagrammatically at 324, for selectively energizing the coils 309 and 314. Switch 324 includes an operating handle 325 adapted to be actuated by the operator in either of two pivotal directions. The handle carries, by any suitable means, a pair of contacting bars 327 and 328, bar 327 being adapted to engage and electrically connect a pair of contacts 329 and 330, while bar 328 is similarly adapted to engage and electrically connect a pair of contacts 331 and 332. In the normal position of the switch 324, as illustrated, both of the bars 327 and 328 are out of engagement with the contacts and, consequently, both circuits through the switch are open.

Contacts 330 and 332 are connected by lines 334 and 335 to a line 336, which, in turn, is connected to one side of a suitable source of electric current, not shown. A line 337, which is similarly connected to the opposite side of the source of electric current, is connected by means of a line 338 to the coil 314 and a line 339 to the contact 331, and the line 337 is also connected by means of the line 271, the micro switch 270, line 272, coil 309 and line 341 to the contact 329.

It will be apparent from the above that when the handle 325 of switch 324 is shifted in a counterclockwise direction, as viewed in the drawing, it will energize coil 309 by closing a circuit through lines 336 and 334, contact 330, bar 327, contact 339, line 341, coil 309, line 272, micro switch 270 and line 271 to the return line 337. This will result in the opening of valve 300 and the admission of fluid under pressure to the upper end of the cylinder to start the press-fitting operation. The downward movement of the piston 282 in cylinder 275 will continue until the circuit to coil 309 is broken by opening the micro switch 270, which opening of the micro switch is effected by actuation of arm 248 of the mechanism illustrated in Figure 16, as previously described.

As soon as the circuit is broken at the micro switch, spring 307 will return the spool of valve 308 to the closed position illustrated and the press will stop. Thereupon, the operator may shift the handle 324 in a clockwise direction to open the circuit between contacts 329 and 330 and close the circuit between contacts 331 and 332. When the latter circuit is closed, coil 314 is energized by connection from line 336 through line 335, contact 332, bar 328, contact 331, line 339, coil 314, line 338 and return line 337, thus opening valve 301 and effecting the return movement of piston 282.

It is apparent, therefore, that there is provided in accordance with Figures 16 to 22 an exceedingly simple mechanism for adjusting the bumper on a vibration mounting incorporating automatic means for stopping the bumper moving operation when the mounting has exactly the desired deflection characteristic. As previously indicated in connection with earlier modifications, the mechanism of Figures 16 to 22 may be equally well adapted to shift the position of an integral bumper flange on either of the rigid members of the mounting.

If a more simplified control mechanism is desired, it is apparent that in the apparatus of Figures 16 to 22 there may be employed a pair of manually controlled valves corresponding to the valves 300 and 301 or a single manually controlled four-way valve of conventional construction, provided suitable means are incorporated in the machine to indicate to the operator when the mounting has the desired deflection characteristic. Accordingly, there is illustrated in Figure 23 a simple incandescent lamp signaling circuit which is energized by means of the closing of a micro switch 350 by means of the adjusting screw 266' on an arm 248', which corresponds to the arm 248 of Figure 16.

Micro switch 350 is incorporated in a circuit including a suitable signaling lamp 351 and any suitable source of electric energy, such as that indicated diagrammatically at 352. In this case, when the mounting reaches the desired deflection characteristic the arm 248' will be actuated in the manner previously described to close the lamp circuit and thus light the lamp and indicate to the operator that the press should be stopped. The remaining portions of the mechanism will, of course, be identical to those illustrated in connection with Figures 16 to 21.

The manner of making the adjustments and the mode of operation of the member may be modified and somewhat simplified, if desired, by incorporating a fixed stop to limit upward movement of the arm 248 of Figure 16 to that position in which the axial displacement between the members 11 and 12 of the mounting during the press-fitting operation is equal to the desired deflection at rated loads, and such an arrangement is illustrated in the fragmentary illustration of Figure 24. As there shown, the arm 248'', which corresponds to the arm 248 of Figure 16, is identical in construction to arm 248 and carries a similar set screw 258'' for adjusting the tension of the spring 261''. It also carries a similar adjusting screw 266'' for actuating the micro switch 270''. In addition to the above features, which are identical to those of Figure 16, the extremity of the arm 248'' is provided with a projection 360, which is adapted to engage a projection 361 on a split clamping ring 362, which is clamped around the bolt 242'', which corresponds to one of the bolts 242 of Figure 16. The split clamping ring 362 is held in any desired vertically adjusted position by means of a bolt 363 extending through ears on the split clamping ring 362, in the usual manner.

All of the remaining features of the machine may be identical to those illustrated in Figures 16 to 22, or, if desired, they may incorporate the indicating circuit of Figure 23 in place of the automatic shut-off circuit of Figure 22.

When operating the mechanism of Figure 24, the split clamping ring 362 is adjusted vertically on the bolt 242 until it limits the upward movement of the arm 248'' to a position in which the initial gap between the lower end of the inner sleeve 11 and the upper end of the arbor 246 (see Figure 19) is exactly equal to the desired deflection at rated load and the adjusting screw 266'' is adjusted to a position in which it just contacts the roller 268'' on the stem 269'' of the micro switch 270''. In addition, the set screw 258'' is so adjusted that, or the spring 261'' is so selected that, the upward pressure exerted by the spring 261'' on the arm 248'' when the projection 360 of the arm engages the stop 361, when divided by the mechanical advantage provided by arm 248", exactly equals the rated load for the mounting.

In this case, it will be apparent that as soon as the downward force exerted by the outer sleeve 12 upon the supporting ring 255 exceeds by a minute amount the rated load of the mounting for the then existing rated axial deflection, the arm 248" will move away from the stop 361 and will actuate the micro switch 270" and thereby effect a stoppage of the press-fitting operation. The actual movement of the arm 248" necessary to operate the micro switch 270" is so small that the increase in deflection resistance necessary to cause it is negligible and, consequently, the press will be stopped when the vibration mounting has the desired deflection characteristics.

The calibrated spring 261 of Figure 16 or 261" of Figure 24 may, of course, be replaced by weights, in the manner shown in Figure 16. It is only necessary that some means be provided for exerting a known or measurable force on the lever arm. In the case of weights, the force is easily ascertained and is relatively independent of the position of the arm. When a calibrated spring is used the force varies with the position of the arm, but the rate of variation is known and hence the force for any position of the arm is also known.

In Figures 25 through 28 is illustrated a further apparatus differing from the previous forms in that it is designed to operate on a slightly different type of vibration mounting and, moreover, is capable of either increasing or decreasing the deflection resistance of the mounting.

Referring to Figure 25, the type of vibration mounting under consideration includes an inner member 370 of tubular form and an outer member, indicated generally at 371, which is made up of a pair of annular stampings 372 and 373, having mating flanges which are spot welded or otherwise secured together. The stampings 372 and 373 are of such form that when secured together they form a generally U-shaped, inwardly opening, annular channel adapted to receive the periphery of an annular disc-like rubber member 375, having a central opening within which is fitted the inner member 370. The rubber member 375 may be molded to final form and bonded or otherwise suitably secured to the members 370 and 371. This type of mounting is particularly adapted for light duty wherein the primary direction of oscillation or vibration between the rigid members is axial in direction.

It will be noted that the stampings 372 and 373 have flanges 376 and 377, respectively, which overlie a portion of the top and bottom surfaces of the rubber member 375 and, therefore, function as bumpers limiting the relative axial movement between the rigid members of the mounting. It will be apparent that by deflecting the flanges 376 and 377 toward or away from the rubber member the resistance of the mounting to axial deflection may be increased or decreased, respectively. The machine illustrated in Figures 25 through 28 is designed to deflect the lower flange 377 in either direction, as desired, to adjust the deflection resistance of the mounting as required.

Referring particularly to Figure 25, the machine, as illustrated, is essentially a conventional rack and pinion type of hand press suitably modified and adapted to carry out the deflection adjusting method of the present invention. Thus, the machine comprises a base 380 and an upstanding frame 381 having a rectangular guide 382 adapted to receive a rack bar 383 which is driven by a suitable pinion, not shown, which, in turn, is rotated by the handle 384 in any suitable or conventional manner. The teeth of the rack, not illustrated in the drawing, are located on the front face of the rack bar 383. It is sufficient to note that when the handle 384 is rotated the rack bar will be caused to move in a vertical path either upwardly or downwardly, depending upon the direction of rotation of the handle.

The lower end of the rack bar 383 is provided with a reduced threaded extremity 385, upon which is threaded a sleeve-like member 386, the lower end 387 of which is adapted to engage the rubber member 375 immediately adjacent the flange 376 on the stamping 372 of the mounting. The mounting, in turn, is supported upon a ring 388 having its upper surface contoured to fit the lower stamping 373, but it will be noted that the interior of the ring does not engage the innermost portion of the lower flange 377. Ring 388 rests upon a second ring 389, which, in turn, rests upon the base 380 of the machine.

The rack bar, as best shown in Figures 25 and 26, is provided with a groove 390 in its front face extending throughout its length and slightly beyond the center of the bar. Positioned within the groove is a push rod 391, having at its lower end a tapered projection 392 adapted to project within the inner sleeve 370 of the mounting. Immediately above the reduced projection 392 the rod is provided with a shoulder 393, which rests upon the top end of the sleeve 370. Rod 391 projects above the upper end of the rack bar 383, where it is threaded at 395 to receive an adjusting nut 396 having a relatively pointed nose 397 projecting upwardly in line with the push rod 391.

The upstanding frame 381 of the machine is provided with an upwardly projecting bracket arm 398, to which is pivoted an arm 399 by means of a roller bearing pivot, indicated generally at 400. The free end of the arm is similarly pivoted to a rod 401 adapted to carry any desired number of weights 402 of the type commonly used in weighing scales.

A second upwardly projecting bracket 403 on the frame 381 pivotally supports a stop projection 404 adapted to engage the underside of arm 399 and support it against the force exerted by the weights 402. The stop 404 is fixed to a shaft 405 journaled in the bracket 403, and the shaft 405, in turn, is fixed to a handle 406 by means of which the stop 404 may be shifted into or out of engagement with the arm 399.

As best shown in Figures 25 and 27, the arm 399 has secured thereto a generally L-shaped bracket 407, the lower leg 408 of which projects forwardly of the arm 399 and is provided with a slot adapted to receive the push rod 395 in the manner best illustrated in Figure 27 when it is desired to lift the push rod out of engagement with the mounting. To accomplish this operation it is only necessary to tip the push rod forwardly and lift the nut 396 above the slot in the arm 408 of the bracket 407, whereupon the rod is moved into the slot and held in the manner shown in Figure 27, in which position the lower end of the push rod is out of contact with the mounting.

The bracket 403 is provided with an upward projection 409, upon which is mounted, in any suitable manner, a dial indicator 410 having its plunger 411 contacting the upper edge of arm 399. The dial indicator is of the conventional type employed in measuring minute movements, and incorporates a pointer 412 by means of which the degree of movement is indicated.

The operation of the mechanism disclosed in Figures 25 through 27 is as follows. After the mounting is placed in position upon the ring 388, the push rod 391 is disengaged from the bracket 407 and swung into position beneath the arm 399. At this time the nut 396 is threaded on the rod at such a point that it just contacts the depression 413 formed in the underside of the bracket 407 when the arm 399 is supported upon the stop 404 and the lower end of the rod is resting upon the inner member 370 of the mounting. The dial indicator 410 is so adjusted that when the arm 399 rests upon the stop 404 the pointer 412 gives a zero reading.

Handle 406 is then operated to remove the stop 404 from beneath the arm 399 and thereby cause the weights 402 and the arm 399 to force the plunger downwardly and deflect the inner member 370 of the mounting axially with respect to the outer member 371. The amount of such deflection will be recorded upon the indicator 410, and, as the force imposed by the weights 402 corresponds to the rated load for the mounting, the indicator will show the deflection at rated load.

If it be assumed that the deflection is insufficient to satisfy the requirements, the press is then operated by rotating handle 384 in a direction to force the rack bar 383 downwardly. This causes an engagement of the rubber member 375 by the lower end 387 of the sleeve 386 and a consequent downward deflection of the rubber member. Such deflection forces the unsupported flange 377 downwardly and, if the deflection is sufficient, will permanently displace the flange 377 away from the rubber member 375.

It will be observed that during this pressing operation the reading of the indicator 410 will not reflect the deflection characteristics as in the prior mechanisms which operate to increase the deflection resistance of a mounting. However, as soon as the operator has moved the press downwardly a limited distance, he may reverse the direction of rotation of handle 384 and lift the sleeve 386 out of contact with the mounting, whereupon the deflection of the mounting at rated load will be accurately indicated. If the deflection is still insufficient, the pressing operation may be repeated step-by-step in the same manner until the desired softness is obtained. With a little experience, an unskilled operator will be able to adjust the deflection characteristics of the mounting in this manner in a very brief time.

The same machine illustrated in Figures 25 through 28 may be employed to increase the deflection resistance of a mounting, if necessary. Thus, if initial reading of the indicator shows excessive deflection at the rated load, the operator need only remove the ring 388 and place the mounting on the lower supporting ring 389, in the manner illustrated in the fragmentary sectional view of Figure 28.

It will be noted that the ring 389 has an annular projection 414 at the inner margin of its top surface adapted to engage the edge of the abutment flange 377 and thereby support the mounting. It is obvious that if the mounting is forced downwardly while the inner edge of the flange 377 rests on projection 414, the flange 377 will be forced inwardly against the rubber and increase the stiffness of the mounting. This is accomplished by shifting a threaded collar 415, which is threaded upon the exterior of the sleeve 386 downwardly until a shoulder 416 on the collar engages a shoulder 417 on the sleeve, as best shown in Figure 28. In this position, the bottom edge of the collar 415 will engage the upper stamping 372 of the outer member 371 of the mounting.

After these adjustments or alterations have been made, the handle 384 of the press is operated to force the rack 383 downwardly, thereby causing the projection 414 on ring 389 to deflect the flange 377 upwardly against the rubber member 375, thus increasing the deflection resistance of the mounting. It will be understood that during this pressing operation the stop 404 will be maintained beneath the arm 399. As soon as the flange 377 has been bent upwardly to what is thought to be the desired extent, the deflection characteristics of the mounting are checked by raising the press to relieve the pressure on the mounting, adjusting the nut 396 to contact with the arm 399, and removing the stop 404, thus permitting the indicator 410 to indicate the deflection of the mounting incident to the load applied by the weights 402. As in the previous operation, the operation last described may be repeated, if necessary, until the desired deflection characteristic is obtained.

It is apparent that there is provided in accordance with the present invention simple and practical methods and apparatus for producing vibration mountings of accurately calibrated deflection characteristics. While the invention is illustrated and described in connection with mountings of the type employing a pair of concentric rigid members, it will be appreciated that the principles of the invention are equally applicable to any type of vibration mounting incorporating a pair of rigid members separated by a layer of resilient rubber.

It is apparent, further, that while several mechanisms are illustrated and described, further modifications of the mechanisms are available within the spirit of the invention and the scope of the appended claims.

What is claimed is:

1. The method of making a precision antivibration mounting of the type including a pair of relatively rigid members separated by a rubber element, said members being relatively movable in parallel paths only by distortion of said rubber element, at least one of said members having a bumper for engaging said rubber element and thereby resisting such relative movement between the members, which comprises assembling said rigid members and said rubber element together so that the rigid members are movable only through distortion of the rubber element, holding one of said members stationary, displacing said members axially by subjecting the other member to a force acting in a direction parallel to said paths and toward the bumper on said one member to distort the rubber element, and thereafter progressively displacing said bumper on one of said members toward the rubber element until the deflection characteristic of the mounting reaches a predetermined amount.

2. In a method of making a precision antivibration mounting of the type including a pair of relatively rigid members separated by a rubber element, said members being relatively movable in parallel paths only by shear deflection of said rubber element, at least one of said members having a bumper for engaging said rubber element and thereby resisting such relative movement between the members, the steps which comprise, after assembly of said rigid members and said rubber element so that said members are movable only through distortion of said element, holding one of said members carrying a bumper stationary, subjecting the other member to a known force acting in a direction parallel to said paths and toward the bumper on the other member, and permanently and progressively deflecting said last mentioned bumper in a direction opposite to the direction of said force against sad other member and against the rubber element until the displacement of the other member incident to said force is reduced to a predetermined amount.

3. In a method of making a precision antivibration mounting of the type including a pair of relatively rigid members separated by a rubber element, said members being relatively movable in parallel paths only by deflection of said rubber element, at least one of said members having a bumper for engaging said rubber element and thereby resisting such relative movement between the members, the steps which comprise, after assembly of said rigid members and said rubber element so that said members are movable only through distortion of said element, yieldingly holding one of said members in a fixed position by imposing a known force against the member and positively limiting the movement of the member in response to said force, displacing the other member relative to the first member in a direction parallel to said surfaces by a predetermined amount, and then progressively displacing a bumper on said other member toward said rubber element and in a direction opposite to said force until the first member shifts from said fixed position.

4. In a method of making a precision antivibration mounting of the type including a pair of concentric members having an annular space therebetween, an annular rubber element in said space and connecting said members, and an annular bumper on at least one of said members for engaging the rubber element and thereby resisting relative axial displacement between said members, the steps which comprise, after assembly of said concentric members and said rubber element so that said rubber element is in the space between said concentric members and said concentric members are movable only by deformation of said rubber element, permanently displacing said bumper in an axial direction toward said rubber element until the displacement of the other member incident to a known force acting on the other member in a direction opposite to said bumper displacement is reduced to a predetermined amount.

5. In a method of making a precision antivibration mounting of the type including a pair of concentric members having an annular space therebetween, an annular rubber element in said space and connecting said members, and an annular bumper on at least one of said members for engaging the rubber element and thereby resisting relative axial displacement between said members, the steps which comprise, after assembly of said concentric members and said rubber element so that said rubber element is in the space between said concentric members and said concentric members are movable only by deformation of said rubber element, holding one of said members stationary, laterally displacing the two members from their equilibrium position by subjecting the other member to a force acting in a direction parallel to the axis of said concentric members and toward the bumper on said one member, and progressively displacing the bumper on said stationarily held member toward the rubber element until the deflection characteristic of the mounting reaches a predetermined amount.

6. The method of making a precision antivibration mounting of the type including a pair of concentric members having an annular space therebetween, an annular rubber element in said space and connecting said members, and an annular bumper on at least one of said members for engaging the rubber element and thereby resisting relative axial displacement between said members, which comprises assembling said concentric members and said rubber element with the members movable axially only through distortion of said rubber element, holding one of said members stationary, subjecting the other member to a known force acting in a direction parallel to said paths and toward the bumper on said one member, and progressively displacing the bumper on said last mentioned member toward the rubber element until the displacement of the other member incident to said force acting on the other member in a direction opposite to said bumper displacement is reduced to a predetermined amount.

7. The method of making a precision antivibration mounting of the type including a pair of concentric members having an annular space therebetween, an annular rubber element in said space and connecting said members, and an annular bumper on at least one of said members for engaging the rubber element and thereby resisting relative axial displacement between said members, which comprises assembling said concentric members and said rubber element together with the members movable axially relative to each other only through distortion of the rubber element, yieldingly holding one of said members in a fixed position by imposing a known force against the member and positively limiting the movement of the member in response to said force, displacing the other member relative to the first member in a direction parallel to said surfaces by a predetermined amount, and then progressively displacing a bumper on said other member toward said rubber element and in a direction opposite to said force until the first member shifts from said fixed position.

8. In a method of adjusting a precision antivibration mounting of the type including a pair of rigid concentric members having an annular space therebetween, an annular rubber element in said space and connecting said members, and an annular bumper on at least one of said members for engaging the rubber element and thereby resisting relative axial displacement between said members, said bumper being in the form of a flange on one of the members, the step which comprises, after assembly of said rubber element in the annular space between said rigid concentric members, progressively bending said flange in an axial direction with reference to the rubber element of the assembled mounting until said flange reaches a predetermined position with respect to the rubber element.

9. In a method of making a precision antivibration mounting of the type including a pair of concentric members having an annular space therebetween, an annular rubber element in said space and connecting said members, and an annular bumper on at least one of said members for engaging the rubber element and thereby resisting relative axial displacement between said members, said bumper being in the form of an integral flange on one of said members, the steps which comprise, after assembly of said concentric members and said rubber element so that said rubber element is in the space between said concentric members and said concentric members are movable only by deformation of said rubber element, holding one of said members stationary, subjecting the other member to a force acting in a direction parallel to said paths and toward the bumper on said one member, and thereafter progressively displacing the bumper on said first mentioned member toward the rubber element until the deflection characteristic of the mounting reaches a predetermined amount.

10. The method of making a precision antivibration mounting of the type including a pair of concentric members having an annular space therebetween, an annular rubber element in said space and connecting said members, and an annular bumper on at least one of said members for engaging the rubber element and thereby resisting relative axial displacement between said members, said bumper being in the form of a flange on one of the members, which comprises holding said one member, subjecting the other member to a known force acting axially of the members toward the bumper flange on the held member, and progressively bending the bumper flange on the held member toward the rubber until the axial displacement of the other member incident to said force is reduced to a predetermined amount.

11. The method of making a precision antivibration mounting of the type including a pair of concentric members having an annular space therebetween, an annular rubber element in said space and connecting said members, and an annular bumper on at least one of said members for engaging the rubber element and thereby resisting relative axial displacement between said members, said bumper being in the form of an integral flange on one of said members, which comprises yieldingly holding one of said members in a fixed position by imposing a known force against the member and positively limiting the movement of the member in response to said force, displacing the other member relative to the first member in a direction parallel to said surfaces by a predetermined amount, and then progressively displacing the bumper flange on said other member toward said rubber element and in a direction opposite to said force until the first member shifts from said fixed position.

12. In a method of adjusting a precision antivibration mounting of the type comprising inner and outer members having concentric spaced cylindrical surfaces, respectively, with an annular rubber element between said surfaces and an annular bumper at one end of each member for engaging the opposite ends of the rubber element and thereby resisting relative axial movement between the members, the steps which comprise pressing one of the bumpers axially onto the cylindrical surface of one of the members with a press fit after the members and rubber element have been assembled, measuring distortion of the exposed end of the rubber element in the assembled mounting and determining the desired position of said bumper from said measurement of said distortion.

13. In a method of adjusting a precision antivibration mounting of the type comprising inner and outer members having concentric spaced cylindrical surfaces, respectively, with an annular rubber element between said surfaces and an annular bumper at one end of each member for engaging the opposite ends of the rubber element and thereby resisting relative axial movement between the members, the steps which comprise pressing one of the bumpers axially onto one of the members with a press fit after the member and rubber element have been assembled, measuring distortion of the exposed end of the rubber element in the assembled mounting and determining the desired position of said bumper from said measurement of said distortion.

14. In a method of adjusting a precision antivibration mounting of the type comprising inner and outer members having concentric spaced cylindrical surfaces, respectively, with an annular rubber element between said surfaces and an annular bumper at one end of each member for engaging the opposite ends of the rubber element and thereby resisting relative axial movement between the members, the step which comprises, after assembly of said rubber element between said inner and outer members so that said inner and outer members are relatively movable only through distortion of the rubber element, pressing one of the bumpers axially onto the cylindrical surface of one of the members by a press fit until the displacement of the other member incident to a known force acting on the other member in a direction opposite to said bumper movement is a predetermined amount.

15. In a method of making a precision antivibration mounting of the type comprising inner and outer members having concentric spaced cylindrical surfaces, respectively, with an annular rubber element between said surfaces and an annular bumper at one end of each member for engaging the opposite ends of the rubber element and thereby resisting relative axial movement between the members, the steps which comprise, after assembly of said rubber element between said inner and outer members so that said inner and outer members are relatively movable only through distortion of the rubber element, holding one of said members, subjecting the other member to a known force acting axially of the member toward the bumper on the held member, and progressively pressing the bumper on the cylindrical surface of the held member toward the rubber with a press fit until the axial displacement of the other member incident to said force is reduced to a predetermined amount.

16. In a method of making a precision antivibration mounting of the type comprising inner and outer members having concentric spaced cylindrical surfaces, respectively, with an annular rubber element between said surfaces and an annular bumper at one end of each member for engaging the opposite ends of the rubber element and thereby resisting relative axial movement between the members, the steps which comprise, after assembly of said rubber element between said inner and outer members so that said inner and outer members are relatively movable only through distortion of the rubber element, yieldingly holding one of the members in a fixed position by imposing a known force against the member and positively limiting the movement of the member in response to said force, displacing the other member relative to the first member in a direction parallel to said surfaces by a predetermined amount, and then progressively pressing a bumper on the cylindrical surface of the other member toward the rubber element and in a direction opposite to that of the force acting on the first member with a press fit until the first member shifts from said fixed position.

17. In the method of making a precision antivibration mounting having a pair of rigid members separated by a rubber element so that said rigid members are relatively movable in parallel paths by deflection of said rubber element, wherein said rigid members and said rubber element are first assembled in desired relation and wherein a bumper for engaging said rubber element is disposed on only one side of said rigid members, the step which comprises permanently displacing said bumper relative to said rubber element in a direction parallel to said paths while applying a force against the rigid member with which the bumper being displaced is not in contact, which force tends to resist the movement of the last mentioned rigid member caused by displacement of said bumper, whereby a mounting of a desired load deflection characteristic is obtained.

LEON F. THIRY.

REFERENCES CITED

The following references are of record in the file of this patent:

UNITED STATES PATENTS

| Number | Name | Date |
|---|---|---|
| Re. 18,843 | Skillman | May 30, 1933 |
| 207,245 | Britton | Aug. 20, 1878 |
| 440,938 | Anthoni | Nov. 18, 1890 |
| 1,734,025 | Zeibig | Oct. 29, 1929 |
| 1,739,270 | Thiry | Dec. 10, 1929 |
| 1,827,267 | Short | Oct. 13, 1931 |
| 1,913,933 | Lamborn et al. | June 13, 1933 |
| 1,992,631 | Picquerez | Feb. 26, 1935 |
| 1,994,388 | Ericksen | Mar. 12, 1935 |
| 2,008,772 | Robertson | July 23, 1935 |
| 2,027,560 | Skillman | Jan. 14, 1936 |
| 2,052,448 | Colaert | Aug. 25, 1936 |
| 2,093,092 | McElhaney et al. | Sept. 14, 1937 |
| 2,118,756 | Bergert | May 24, 1938 |
| 2,122,839 | Guy | July 5, 1938 |
| 2,172,641 | Piron | Sept. 12, 1939 |

FOREIGN PATENTS

| Number | Country | Date |
|---|---|---|
| 2,684 | Australia | July 7, 1926 |